US012588582B2

(12) United States Patent
Ablass et al.

(10) Patent No.: US 12,588,582 B2
(45) Date of Patent: Mar. 31, 2026

(54) COATED AGRICULTURAL METERING COMPONENT

(71) Applicant: CNH Industrial Canada, Ltd.,
Saskatoon (CA)

(72) Inventors: Nathan Edwin Ablass, Martensville
(CA); Jack R. Chappell, Saskatoon
(CA)

(73) Assignee: CNH Industrial Canada, Ltd.,
Saskatoon (CA)

( * ) Notice: Subject to any disclaimer, the term of this
patent is extended or adjusted under 35
U.S.C. 154(b) by 888 days.

(21) Appl. No.: 17/882,911

(22) Filed: Aug. 8, 2022

(65) Prior Publication Data

US 2024/0040957 A1    Feb. 8, 2024

(51) Int. Cl.
*A01C 7/10*        (2006.01)
*A01C 7/04*        (2006.01)
*A01C 7/08*        (2006.01)

(52) U.S. Cl.
CPC .............. *A01C 7/102* (2013.01); *A01C 7/044*
(2013.01); *A01C 7/084* (2013.01)

(58) Field of Classification Search
CPC .. A01C 7/102; A01C 7/10; A01C 7/08; A01C
7/00; A01C 7/044; A01C 7/042; A01C
7/04; A01C 7/084; A01C 7/081
See application file for complete search history.

(56) References Cited

U.S. PATENT DOCUMENTS

| | | | |
|---|---|---|---|
| 1,376,933 A | 5/1921 | Gould | |
| 2,960,258 A | 11/1960 | Dodwell | |
| 3,156,201 A | 11/1964 | Tweedale | |
| 3,757,995 A | 9/1973 | Armstrong | |
| 3,903,815 A | 9/1975 | Winkler | |
| 3,999,690 A | 12/1976 | Deckler | |
| 4,023,509 A | 5/1977 | Hanson | |
| 4,301,730 A * | 11/1981 | Heurich ................... | B41N 7/06 |
| | | | 101/483 |
| 4,579,632 A * | 4/1986 | Brotz ....................... | C25D 1/10 |
| | | | 205/73 |
| 4,847,162 A * | 7/1989 | Haluska ............ | H01L 21/02216 |
| | | | 427/404 |

(Continued)

FOREIGN PATENT DOCUMENTS

| | | |
|---|---|---|
| CA | 2729700 | 7/2011 |
| CA | 2984836 | 7/2011 |

(Continued)

OTHER PUBLICATIONS

Sunflower, 9900 Series Air Cart Features | Sunflower Seeding Tools,
https://www.sunflowermfg.com/seeding-equipment/air-carts/air-cart-features.html, 17 pages, Last Visited Oct. 7, 2021.

(Continued)

*Primary Examiner* — Christopher J. Novosad
(74) *Attorney, Agent, or Firm* — Fletcher Yoder, P.C.

(57) ABSTRACT

An agricultural metering system includes a metering system
component, and the metering system component includes a
substrate formed from a polymeric material. The metering
system component further includes a coating disposed on the
polymeric material of the substrate, in which the coating
includes a metallic coating and/or a ceramic coating.

13 Claims, 8 Drawing Sheets

(56) References Cited

U.S. PATENT DOCUMENTS

| | | | |
|---|---|---|---|
| 4,960,050 A * | 10/1990 | Hatch | B41N 7/06 |
| | | | 427/255.6 |
| 5,025,736 A | 6/1991 | Anderson | |
| 5,170,909 A | 12/1992 | Lundie et al. | |
| 5,784,985 A | 7/1998 | Lodico et al. | |
| 5,848,571 A | 12/1998 | Stufflebeam et al. | |
| 5,855,303 A | 1/1999 | Gregor | |
| 6,269,758 B1 | 8/2001 | Sauder | |
| 6,651,570 B1 | 11/2003 | Thiemke | |
| 6,729,249 B2 | 5/2004 | Sauder et al. | |
| 6,955,131 B2 | 10/2005 | Beaujot et al. | |
| 7,072,248 B2 * | 7/2006 | Gohil | C08K 7/00 |
| | | | 374/102 |
| 7,087,849 B2 | 8/2006 | Brown et al. | |
| 7,147,241 B2 | 12/2006 | Beaujot et al. | |
| 7,661,377 B2 | 2/2010 | Keaton et al. | |
| 7,685,951 B2 | 3/2010 | Beaujot et al. | |
| 7,757,336 B2 | 7/2010 | Varner | |
| 7,861,362 B2 | 1/2011 | Varner | |
| 8,166,895 B2 | 5/2012 | Dean et al. | |
| 8,271,164 B2 | 9/2012 | Mealson et al. | |
| 8,371,238 B2 | 2/2013 | Dean et al. | |
| 8,375,873 B2 | 2/2013 | Nelson et al. | |
| 8,443,742 B2 | 5/2013 | Orrenius | |
| 8,538,716 B2 | 9/2013 | Beaujot et al. | |
| 8,997,886 B2 | 4/2015 | Stark | |
| 9,091,035 B2 | 7/2015 | DeWind | |
| 9,433,141 B2 | 9/2016 | Friedstad et al. | |
| 9,487,188 B2 | 11/2016 | Varner | |
| 9,504,199 B2 | 11/2016 | Wistrand et al. | |
| 9,769,978 B2 | 9/2017 | Radtke | |
| 10,035,658 B2 | 7/2018 | DeWind et al. | |
| D825,126 S | 8/2018 | Varner | |
| D840,123 S | 2/2019 | Varner | |
| 10,246,852 B2 | 4/2019 | DeWind et al. | |
| 10,306,822 B2 | 6/2019 | Melanson et al. | |
| 10,508,404 B2 | 12/2019 | DeWind et al. | |
| 10,555,455 B2 | 2/2020 | Garner et al. | |
| 10,561,058 B2 | 2/2020 | Gilstring | |
| 10,631,454 B2 | 4/2020 | Meyer et al. | |
| 10,779,459 B2 | 9/2020 | Beaujot et al. | |
| RE48,572 E | 6/2021 | Garner et al. | |
| 11,134,605 B1 | 10/2021 | Pirani et al. | |
| 11,277,961 B2 | 3/2022 | Campbell et al. | |
| 11,340,143 B2 | 5/2022 | DeWind | |
| 11,389,943 B2 | 7/2022 | DeWind | |
| 2002/0043201 A1 | 4/2002 | Dunham | |
| 2002/0050238 A1 | 5/2002 | Crabb et al. | |
| 2003/0159631 A1 | 8/2003 | Sauder et al. | |
| 2003/0167986 A1 | 9/2003 | Sauder et al. | |
| 2009/0130778 A1 * | 5/2009 | Kalgutkar | C23C 14/20 |
| | | | 436/526 |
| 2010/0192818 A1 | 8/2010 | Garner et al. | |
| 2010/0192819 A1 | 8/2010 | Garner et al. | |
| 2012/0067260 A1 | 3/2012 | Garner et al. | |
| 2012/0132116 A1 | 5/2012 | Beaujot et al. | |
| 2014/0261116 A1 | 9/2014 | Redman et al. | |
| 2015/0181799 A1 | 7/2015 | Beaujot et al. | |
| 2015/0216109 A1 | 8/2015 | Meyer et al. | |
| 2018/0325345 A1 | 11/2018 | Varner et al. | |
| 2020/0246769 A1 | 8/2020 | Pidwerbesky et al. | |
| 2021/0136998 A1 * | 5/2021 | Stuart | A01C 7/127 |
| 2022/0090354 A1 | 3/2022 | DeWind et al. | |
| 2022/0192078 A1 | 6/2022 | Johansson | |
| 2022/0193948 A1 | 6/2022 | DeWind et al. | |
| 2022/0194714 A1 | 6/2022 | Wind et al. | |
| 2022/0194720 A1 | 6/2022 | DeWind et al. | |
| 2022/0195684 A1 | 6/2022 | DeWind et al. | |
| 2022/0195694 A1 | 6/2022 | DeWind et al. | |
| 2022/0195695 A1 | 6/2022 | DeWind et al. | |
| 2022/0195696 A1 | 6/2022 | DeWind et al. | |
| 2022/0196041 A1 | 6/2022 | DeWind et al. | |

FOREIGN PATENT DOCUMENTS

| | | | |
|---|---|---|---|
| CA | 2934239 | 6/2015 | |
| CA | 3001280 | 4/2017 | |
| CA | 3137233 | 10/2020 | |
| CN | 110508318 A * | 11/2019 | B01D 53/9413 |
| EP | 1135048 | 9/2001 | |
| EP | 2073621 | 7/2009 | |
| EP | 2353355 | 8/2011 | |
| EP | 2480063 | 8/2012 | |
| EP | 2496064 | 9/2012 | |
| EP | 2819499 | 1/2015 | |
| EP | 2934082 | 10/2015 | |
| EP | 3065528 | 9/2016 | |
| EP | 3082393 | 10/2016 | |
| EP | 3358930 | 8/2018 | |
| EP | 3955723 | 2/2022 | |
| GB | 1559378 A | 1/1980 | |
| RU | 2538387 | 12/2013 | |
| SE | 541320 | 5/2015 | |
| SE | 1551290 | 4/2017 | |
| SE | 539967 | 2/2018 | |
| SE | 540519 | 9/2018 | |
| SE | 541432 | 10/2019 | |
| WO | WO2009/143589 A2 * | 3/2009 | F01C 21/02 |
| WO | WO2011056138 | 5/2011 | |
| WO | WO2013049198 | 4/2013 | |
| WO | WO2013130005 | 9/2013 | |
| WO | WO2014098749 | 6/2014 | |
| WO | WO2015094108 | 6/2015 | |
| WO | WO2017061941 | 4/2017 | |

OTHER PUBLICATIONS

Väderstad, Fenix III Seed Meter, https://www.vaderstad.com/en/products/fenix-iii/, last visited Aug. 1, 2022, 6 pgs.

* cited by examiner

112

COATED AGRICULTURAL METERING COMPONENT

BACKGROUND

The disclosure relates generally to an agricultural metering component, and more specifically to a coated agricultural metering component.

Generally, seeding implements (e.g., seeders) are towed behind a tractor or other work vehicle. Seeding implements typically include multiple row units distributed across a width of the implement. Each row unit is configured to deposit seeds at a target depth beneath the soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other agricultural products (e.g., fertilizer) into the trench. The opener/ seed tube may be followed by closing discs that move displaced soil back into the trench and/or a packer wheel that packs the soil on top of the deposited seeds.

In certain configurations, an air cart is used to meter and deliver agricultural product (e.g., seeds, fertilizer, etc.) to the row units of the seeding implement. The air cart generally includes a storage tank (e.g., a pressurized tank), an air source (e.g., a blower), and a metering system. The agricultural product is typically gravity fed from the storage tank to the metering system which distributes a desired volume of agricultural product into an air flow generated by the air source. The air flow carries the agricultural product to the row units via conduits extending between the air cart and the seeding implement. The metering system typically includes meter rollers that regulate the flow of agricultural product based on meter roller geometry and rotation rate.

BRIEF DESCRIPTION

In certain embodiments, an agricultural metering system includes a metering system component, and the metering system component includes a substrate formed from a polymeric material. The metering system component further includes a coating disposed on the polymeric material of the substrate, in which the coating includes a metallic coating and/or a ceramic coating.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Present embodiments include agricultural equipment, such as an agricultural metering system, that may include coated parts in certain areas to improve longevity and lubricity, and to reduce maintenance operations. The coating may be disposed on a polymeric substrate and may include a metallic coating and/or a ceramic coating. In certain embodiments, parts (e.g., previously coated parts or uncoated parts) may be refurbished via disposition of the coating on the substrate of the part. That is, an existing part may be sent to a coating center, and the substrate of the part may be coated with a metallic coating and/or a ceramic coating. The coated part may then be reinstalled and used in the agricultural equipment (e.g., agricultural metering system). By utilizing a coated part, e.g., polymeric substrate with a metallic/ceramic coating, the techniques described herein may provide longer lasting, hardier, and more efficient particulate material metering equipment suitable for dispensing a variety of particulate material (e.g., seeds, fertilizer, and the like).

Figure 1:
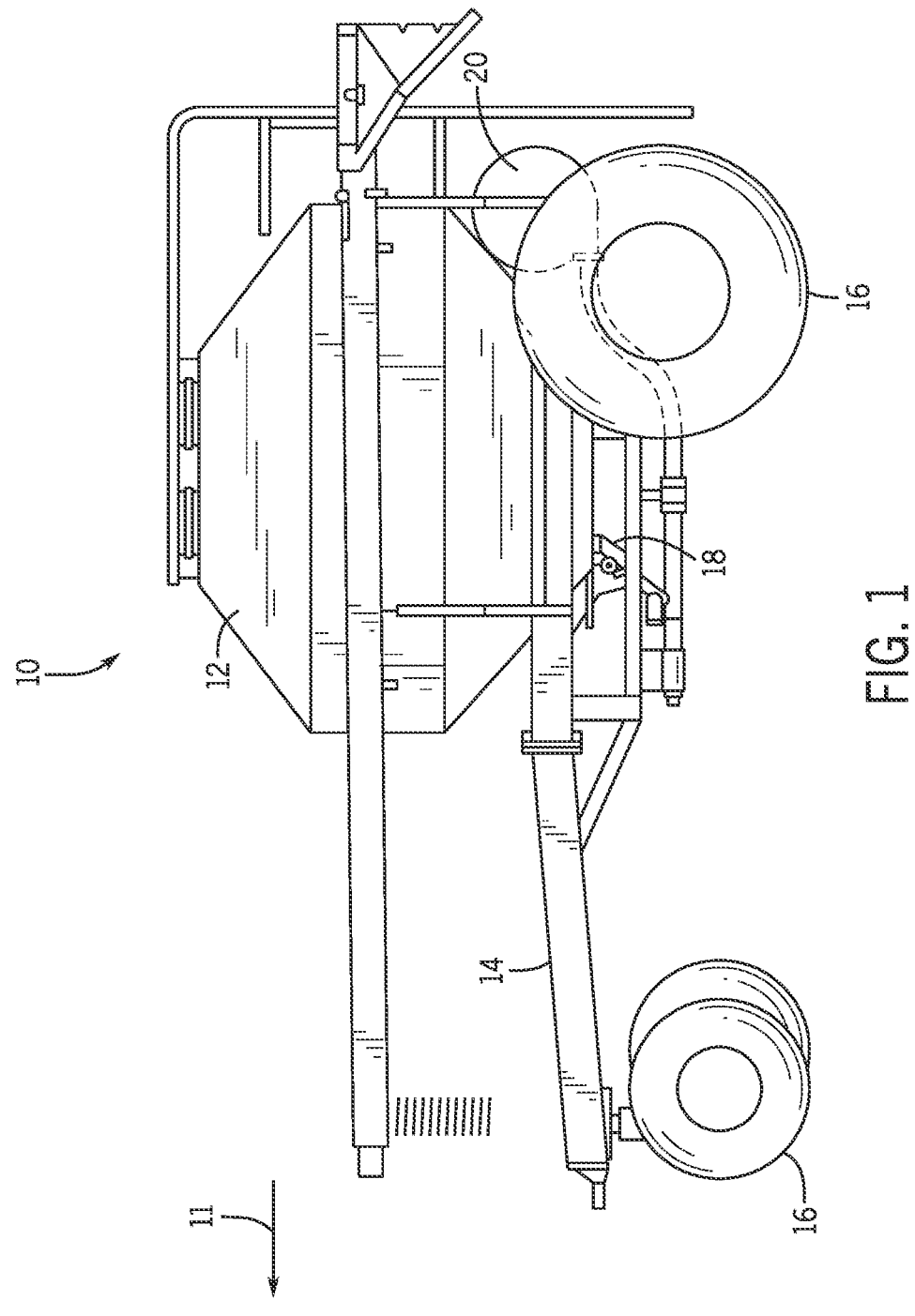
FIG. 1 is a side view of an embodiment of an air cart, including a metering system configured to regulate a flow of particulate material.

Turning now to the drawings, FIG. 1 is a side view of an embodiment of an air cart 10 that may be used in conjunction with a towable agricultural implement to deposit particulate material (e.g., seeds, fertilizer, and so on) into soil. For example, certain agricultural implements include row units configured to open the soil, dispense particulate material into the soil opening, and re-close the soil. Such implements are generally coupled to a tow vehicle, such as a tractor, and pulled through a field. In certain configurations, seeds are conveyed to the row units by the illustrated air cart which is generally towed in sequence with the implement along a direction of travel 11 (e.g., behind the implement or in front of the implement). In certain configurations, the air cart 10 may be configured to provide multiple particulate materials to the row units (e.g., including seeds, fertilizer, and other suitable agricultural products).

In the illustrated embodiment, the air cart 10 includes a storage tank 12, a frame 14, wheels 16, a metering system 18, and an air source 20. In certain configurations, the storage tank 12 includes multiple compartments for storing various flowable particulate materials. For example, one compartment may include seeds, such as canola or mustard, and another compartment may include a dry fertilizer. In such configurations, the air cart 10 is configured to deliver both the seeds and fertilizer to the implement. The frame 14 includes a towing hitch configured to couple to the implement or tow vehicle. As discussed in detail below, seeds and/or fertilizer within the storage tank 12 are gravity fed into the metering system 18.

The metering system 18 includes one or more meter rollers that regulate the flow of particulate material from the storage tank 12 into an air flow provided by the air source 20. The air flow then carries the material to the implement by pneumatic conduits. In this manner, the row units receive a supply of seeds and/or fertilizer for deposition within the soil. The metering system 18 may also include certain coated components that come in contact with the seed and/or fertilizer. Each coated component may include a substrate layer (e.g., polymeric layer) coated with a metallic coating and/or a ceramic coating. The coated layer may provide for enhanced lubricity, as well as improved wear resistance and longevity.

Figure 2:
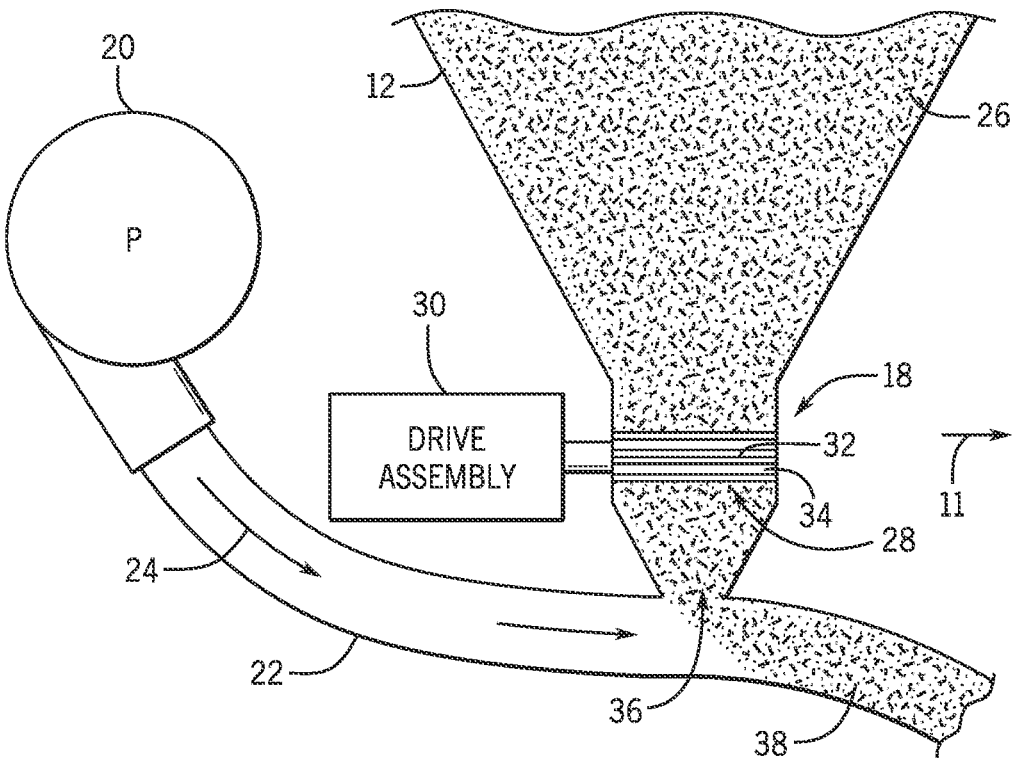
FIG. 2 is a schematic view of an embodiment of a metering system that may be employed within the air cart of FIG. 1.

FIG. 2 is a schematic view of an embodiment of a metering system 18 that may be employed within the air cart of FIG. 1. As illustrated, the air source 20 is coupled to a conduit 22 configured to flow air 24 past the metering system 18. The air source 20 may be a pump or blower powered by an electric or hydraulic motor, for example. Flowable particulate material 26 (e.g., seeds, fertilizer, etc.) within the storage tank 12 flows by gravity into the metering system 18. In certain embodiments, the storage tank 12 is pressurized such that a static pressure in the tank 12 is greater than a static pressure in the conduit 22, thereby facilitating an even flow of particulate material through the metering system 18. The metering system 18 includes one or more meter rollers 28 configured to regulate the flow of particulate material 26 into the air flow 24. In certain embodiments, the metering system 18 may include multiple meter rollers 28 (e.g., housed within individual meter boxes) disposed adjacent to one another. In addition, certain metering systems 18 may include twelve meter rollers 28, each housed within an individual meter box and each configured to flow particulate material into a respective conduit 22 (e.g., of a material distribution system) for distribution to one or more respective row units of the agricultural implement. However, in certain embodiments, the metering system 18 may include more or fewer meter rollers, e.g., 1, 2, 3, 4, 5, 6, 7, 8, 9, 10, 11, 13, or more. By independently adjusting the rotation speed of each meter roller, particulate material flow to different portions of the implement may be particularly controlled.

In the illustrated embodiment, the meter roller 28 is coupled to a drive assembly 30 configured to drive the meter roller 28 to rotate. In certain embodiments, the drive assembly 30 includes at least one drive unit, such as an electric or hydraulic motor, configured to drive one or more meter rollers to rotate. For example, in certain embodiments, multiple drive units may be coupled to respective meter rollers to facilitate independent control of the rotation rates of the meter rollers. In further embodiments, the drive assembly 30 may be coupled to a wheel (e.g., via a gear assembly) such that rotation of the wheel drives the meter roller 28 to rotate. Such a configuration automatically varies the rotation rate of the meter roller 28 based on the speed of the air cart.

The meter roller 28 also includes protrusions, such as the illustrated flutes 32, and recesses 34. Each respective recess 34 is disposed between a respective pair of flutes 32. As the meter roller 28 rotates, the respective pair of flutes 32 moves the particulate material 26 (e.g., agricultural product) disposed within the respective recess 34 downwardly, thereby transferring the particulate material 26 to the conduit 22. The number and geometry of the flutes 32 are particularly configured to accommodate the particulate material 26 being distributed. Certain meter rollers 28 may include six flutes 32 and a corresponding number of recesses 34. Alternative meter rollers may include more or fewer flutes 32 and/or recesses 34. For example, the meter roller 28 may include 1, 2, 3, 4, 5, 6, 7, 8, 9, 10, 11, 12, 13, 14, 15, 16, 17, 18, 19, 20, or more flutes 32 and/or recesses 34. In addition, the depth of the recesses 34 and/or the height of the flutes 32 are configured to accommodate the particulate material 26 within the storage tank 12. For example, a meter roller having deeper recesses 34 and fewer flutes 32 may be employed for larger seeds, while a meter roller having shallower recesses 34 and more flutes 32 may be employed for smaller seeds. Other parameters such as flute pitch (i.e., angle of the flute relative to a longitudinal/rotational axis) and flute angle (i.e., angle of the flute relative to a radial axis) may also be particularly selected to accommodate the particulate material 26. While the meter roller includes flutes in the illustrated embodiment, in other embodiments, the meter roller may include other protrusions, and/or the recesses may be omitted. The meter roller 28 may also have a selected length for the particulate material 26 being distributed and/or for a desired flow rate of the particulate material 26. For example, if a higher flow rate of the particulate material is desired, the meter roller may be longer, and if a lower flow rate of the particulate material is desired, the meter roller may be shorter.

One or more surfaces of the meter roller 28, such as one or more surfaces of each flute 32 and/or one or more surfaces of each recess 34, may be formed from a coating. For example, the meter roller 28 may include a substrate formed from a polymeric material, and a coating may be disposed on the polymeric material of the substrate to provide added durability and/or lubricity. The coating may be positioned at the surface(s) configured to engage the particulate material to enhance the longevity of the meter roller, and/or the coating may be positioned at the surface(s) configured to engage a non-rotating component of the metering system to enhance longevity and lubricity of the meter roller. As used herein with regard to the coating disposed on the polymeric material of the substrate, "coating" refers to one or more coating material(s) that are deposited onto the polymeric material (e.g., as a liquid, a gas/vapor, or a powder), as compared to a liner that is coupled to the polymeric material (e.g., via an adhesive, via a mechanical connection, via fastener(s), etc.).

The coating may include a metallic coating and/or a ceramic coating. The metallic coating material may be sprayed and/or electroplated. For example, the polymeric substrate may be cleaned and, in some embodiments, chemically and/or mechanically treated (e.g., sanded, etc.) to create rough surface(s), and then a metallic spray may be applied to the surface(s) of the substrate. The spray may be applied via arc spraying, flame spraying, another suitable technique, or a combination thereof. Additionally or alternatively, surface(s) of the substrate may be prepared for electroplating, such as by applying an acid (e.g., chromic acid) to the surface(s). A solution consisting of palladium and tin salts may then be applied to the surface(s). Next, the surface(s) of the polymeric substrate may be coated with metal (e.g., nickel, copper, and so on) from an electroless plating solution. The palladium and tin salt solution serves as a catalyst for application of the nickel or copper. The metallic coating may then be electroplated by an electroplating system. The coating may include each of the materials applied to the surface(s) of the substrate.

Ceramic coating(s), including a sprayed nanoceramic coating, may also be used. For example, a spray ceramic coating useful in automotive applications (e.g., applied to painted hoods, bumpers, and so on) may be used. The ceramic spray coating may include microscopic nanoparticles of SiO2 and hardeners that adhere to the polymeric substrate. Additionally or alternatively, the ceramic coating may include cermet, which is a combination of ceramic and metal.

Vacuum metalizing may also be used to apply the metallic coating. Before vacuum metalizing is performed, the polymeric substrate may be pretreated. The pretreatment may be performed chemically, mechanically, with low-energy plasma, or a combination thereof. The pretreatment may enhance the adhesion between the polymeric substrate and the metallic coating. Next, a metal is evaporated. The vapor from the metal condenses onto the substrate, leaving a thin layer of metallic coating. To reduce oxidation, the entire process may take place within a vacuum chamber.

In the illustrated embodiment, the rotational axis of the meter roller 28 is oriented substantially parallel to the direction of travel 11 of the air cart. As used herein, substantially parallel may refer to an angle of about 0 to about 45 degrees, about 0 to about 30 degrees, about 0 to about 15 degrees, about 0 to about 5 degrees, or about 0 to about 1 degree relative to an axis/direction (e.g., the direction of travel 11). By way of example, substantially parallel may refer to an angle less than 5 degrees, less than 4 degrees, less than 3 degrees, less than 2 degrees, less than 1 degree, or less than 0.5 degrees relative to an axis/direction. In other embodiments, the meter roller may be oriented at another suitable angle relative to the direction of travel. For example, in certain embodiments, the meter roller may be oriented substantially perpendicular to the direction of travel.

For a particular meter roller configuration/profile, the rotation rate of the meter roller 28 controls the flow of particulate material 26 into the air flow 24. For example, as the meter roller 28 rotates, the meter roller transfers particulate material through an opening 36 in the metering system 18 into a respective conduit 22 (e.g., into a conduit associated with a respective row unit or group of row units). The particulate material then mixes with air from the air source 20, thereby forming an air/material mixture 38. The mixture then flows to the respective row unit(s) of the implement via pneumatic conduit(s), where the seeds and/or fertilizer are deposited within the soil.

Different flowable particulate materials may include particles of different sizes. For example, seeds, such as sunflower, may have a coarse particle size, fertilizer, such as monoammonium phosphate (MAP), may have a medium particle size, and inoculant, such as a granular microbial soil inoculant, may have a fine particle size. Moreover, the target application rate may vary based on the type of flowable particulate material being dispensed. For example, the target flow rate of certain seeds or fertilizers may be higher than the target flow rate of other seeds or fertilizers. Accordingly, certain embodiments of the metering system disclosed herein may facilitate removal and replacement of meter rollers, thereby enabling an operator to select a meter roller suitable for a particular flowable particulate material and for a target dispensing rate (e.g., a target rate for particular field conditions, climate, expected yield, etc.).

Figure 3:
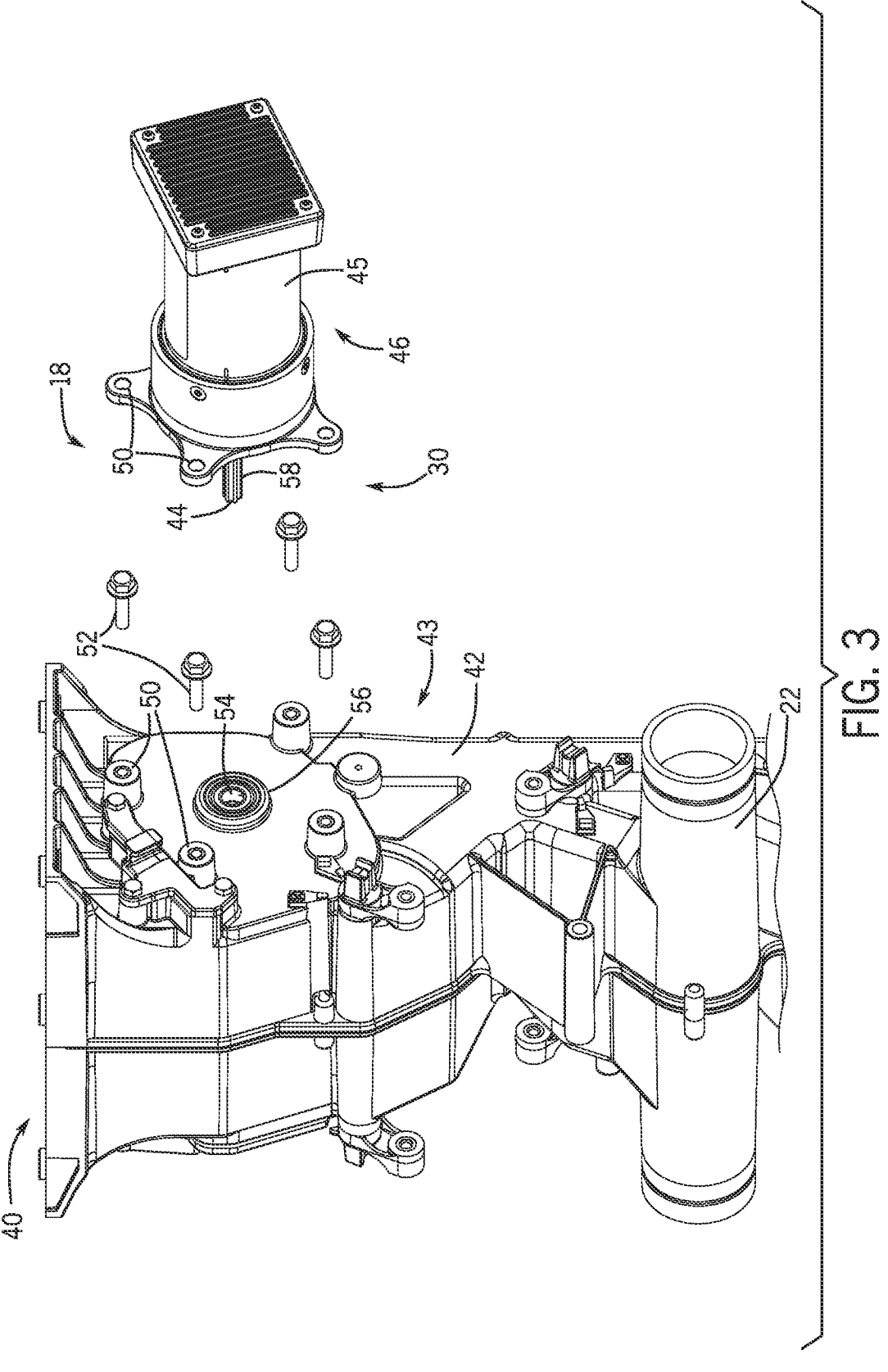
FIG. 3 is an exploded perspective view of an embodiment of a metering system that may be employed within the air cart of FIG. 1.

FIG. 3 is an exploded perspective view of an embodiment of a metering system 18 that may be employed within the air cart of FIG. 1. The metering system 18 includes a meter box 40 and a drive assembly 30. One or more components of the metering system 18, including component(s) of the meter box 40 and/or the drive assembly 30, may include a substrate formed from a polymeric material that is coated with a metallic coating and/or a ceramic coating. The meter box 40 has a passage 42 configured to direct the flowable particulate material to the conduit 22 for transfer to a row unit or group of row units. As shown in FIG. 3, the meter box 40 has a first side 43 (e.g., drive side) for receiving a drive unit 46 of the drive assembly 30. In the illustrated embodiment, the drive unit 46 includes a drive shaft 44 and a motor (e.g., electric motor) 45 that drives the drive shaft to rotate in a clockwise or counter-clockwise direction. The drive unit 46 and the meter box 40 include apertures 50 configured to receive fasteners (e.g., bolts) 52 to secure the drive unit 46 to the meter box 40. The drive shaft 44 is inserted into an opening 54 in the meter box such that the drive shaft 44 engages the meter roller within the meter box 40. The drive shaft 44 is configured to drive the meter roller to rotate. A bearing (e.g., ball bearing) 56 facilitates rotation of the drive shaft 44 and meter roller within the meter box 40. As the conduit 22 transfers air under the passage 42, the motor (e.g., electric motor) of the drive unit 46 drives the drive shaft 44 to rotate the meter roller. As the meter roller rotates, the meter roller dispenses flowable particulate material via the passage 42 to the air flow within the conduit 22 to form the air/material mixture. Further, pressurized air from the tank may flow through the passage 42 with the particulate material from the meter roller.

In the illustrated embodiment, the drive shaft 44 includes a first engagement feature 58, such as protrusions, configured to non-rotatably couple the drive shaft 44 to the meter roller. The protrusions may engage corresponding recesses of the meter roller, thereby non-rotatably coupling the drive shaft 44 to the meter roller. While the drive unit 46 includes an electric motor in the illustrated embodiment, in other embodiments, the drive unit may include any other suitable system configured to drive rotation of the meter roller, such as a hydraulic motor, a pneumatic motor, or a gear assembly coupled to a wheel of the air cart.

Figure 4:
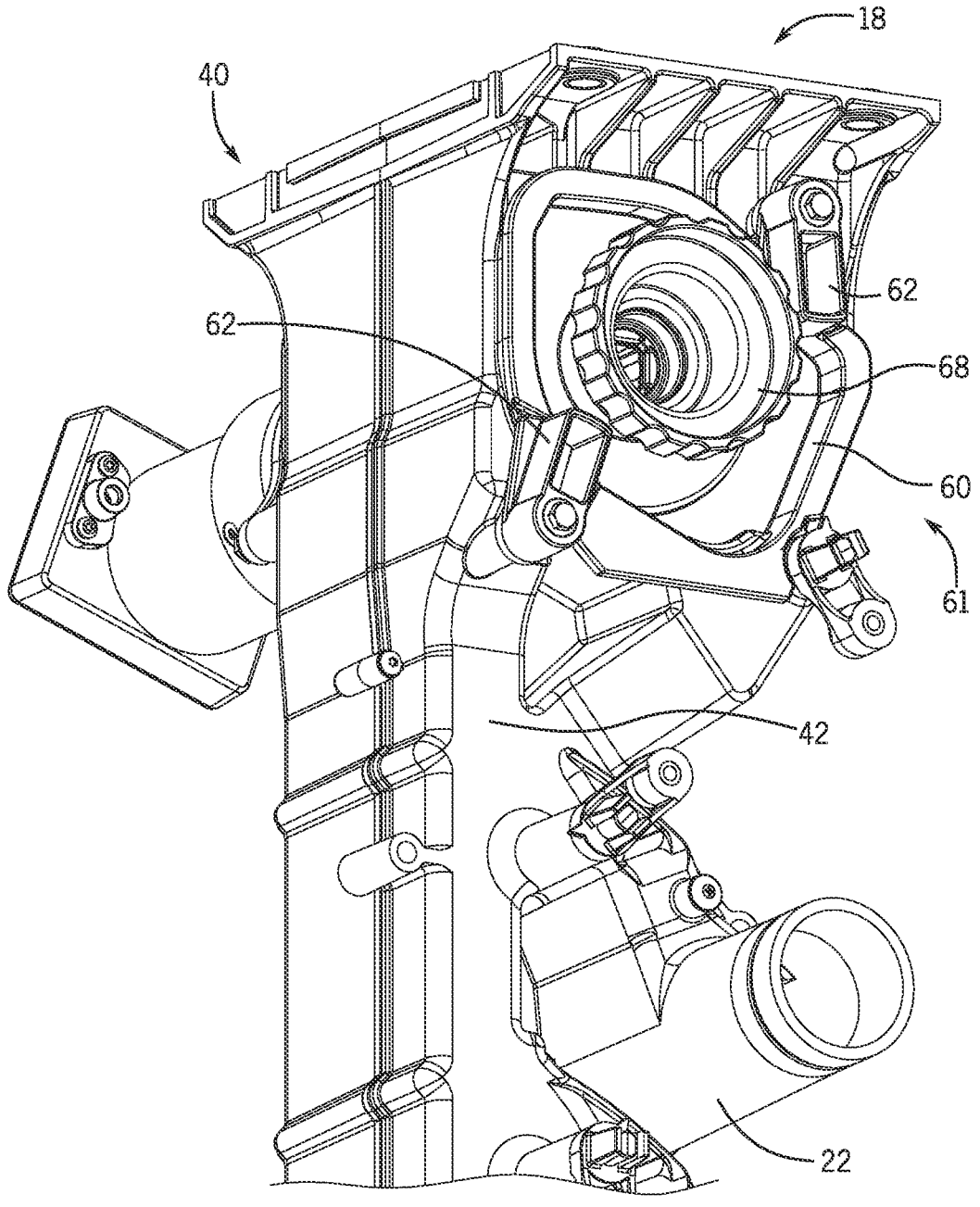
FIG. 4 is a perspective view of the metering system of FIG. 3, in which a cartridge is disposed within a meter box.

FIG. 4 is a perspective view of the metering system 18 of FIG. 3, in which a cartridge 60 is disposed within the meter box 40. One or more components of the cartridge 60 and/or the meter box 40 may include a substrate formed from a polymeric material that is coated with a metallic coating and/or a ceramic coating. As discussed in detail below, the cartridge 60 (e.g., modular meter roller cartridge) is configured to facilitate removal and installation of the meter roller via a meter box opening on a second side 61 (e.g., cartridge side) of the meter box 40. As illustrated, the meter box houses the cartridge 60 while the cartridge is disposed within the opening. While the cartridge 60 is housed within the meter box 40 of the metering system 18 in the illustrated embodiment, in other embodiments, the meter box may house a meter roller without a cartridge, or the meter box may house multiple cartridges (e.g., 2, 3, 4, 5, 6, or more).

In the illustrated embodiment, the metering system 18 is configured to enable the cartridge 60 to engage the meter box 40 via the meter box opening in the second side 61 (e.g., cartridge side) of the meter box 40. While the cartridge 60 is engaged with the meter box 40, the shaft of the drive unit engages the meter roller, thereby enabling the meter roller to be driven in rotation. The cartridge 60 has a cross-sectional shape that substantially corresponds to the cross-sectional shape of the meter box opening. As illustrated, the meter box 40 includes two cartridge locking tabs 62 configured to selectively block removal of the cartridge 60 from the meter box thereby retaining the cartridge 60 within the meter box 40. In the illustrated embodiment, each locking tab 62 is part of a rotatable latch configured to rotate between the illustrated locked position that blocks removal of the cartridge 60 from the meter box 40 and an unlocked position that facilitates removal of the cartridge 60 from the meter box 40. In certain embodiments, each cartridge locking tab includes a recess that engages a corresponding notch on the cartridge 60 to block unintentional rotation of the rotatable latch while the rotatable latch is in the locked position (e.g., due to vibrations of the air cart). The cartridge 60 may be removed by rotating each rotatable latch in a respective first direction and extracting the cartridge 60. Further, the cartridge 60 may be inserted by engaging the cartridge with the meter box 40, and then rotating each latch in a respective second direction, opposite the respective first direction. While each cartridge locking tab 62 is part of a rotatable latch in the illustrated embodiment, in other embodiments, the cartridge locking tab may be part of a spring latch, a bolt latch, or any suitable type of locking mechanism. Furthermore, while the illustrated meter box includes two locking tabs, in other embodiments, the meter box may include more or fewer locking tabs (e.g., 1, 2, 3, 4, etc.). In addition, while the locking tab(s) 62 selectively block removal of the cartridge 60 from the meter box 40 in the illustrated embodiment, in other embodiments, the metering system may include other suitable device(s)/system(s) to selectively block removal of the cartridge from the meter box (e.g., alone or in combination with the locking tab(s)), such as a friction fit system, a magnetic system, other suitable device(s)/system(s), or a combination thereof. In the illustrated embodiment, the cartridge 60 includes a releasable bearing coupler 68. The releasable bearing coupler 68 retains the meter roller within the cartridge, facilitates rotation of the meter roller within the cartridge, and facilitates removal of the meter roller from the cartridge.

Figure 5:
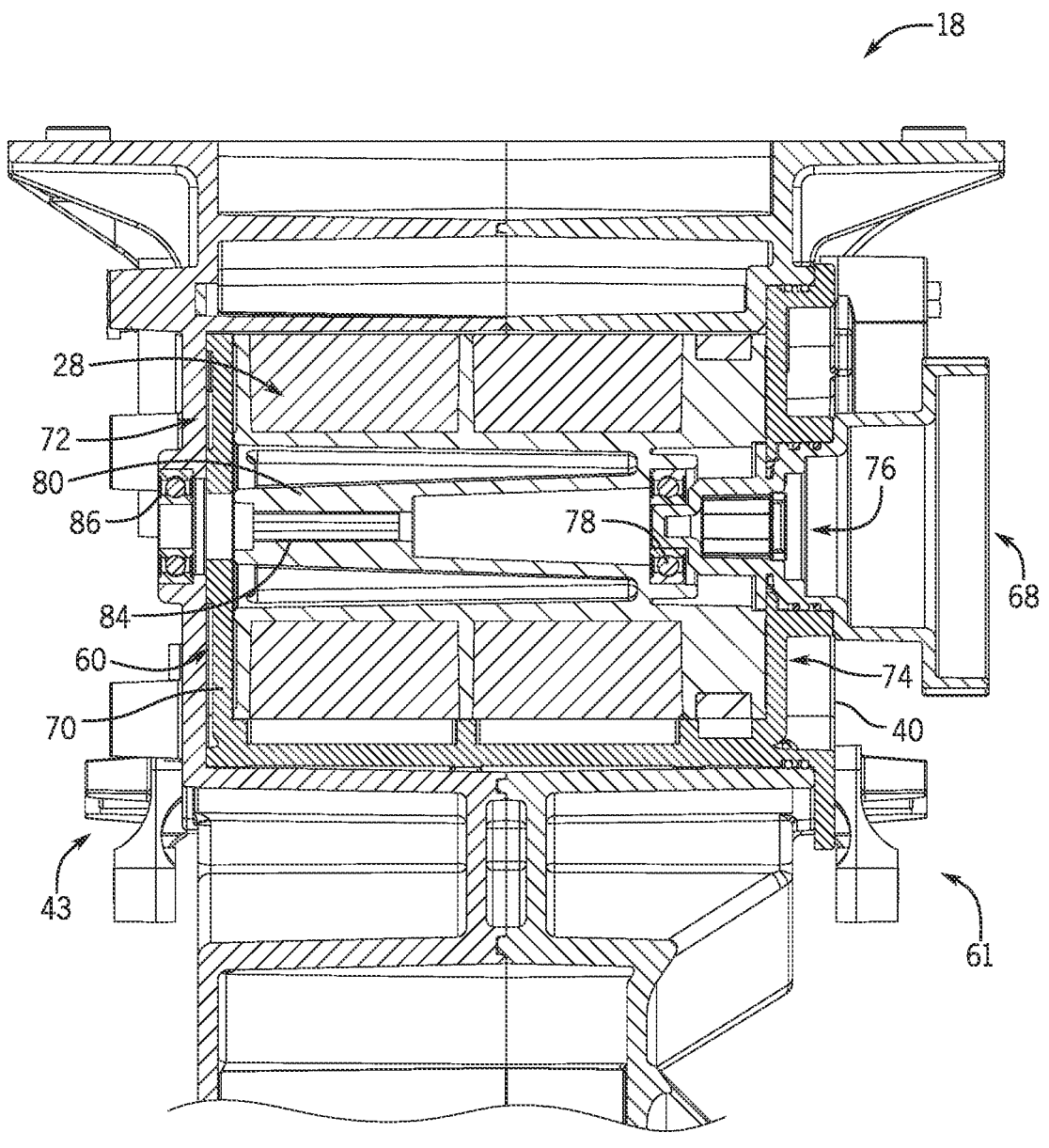
FIG. 5 is a cross-sectional view of the metering system of FIG. 3.

FIG. 5 is a cross-sectional view of the metering system 18 of FIG. 3. As illustrated, the cartridge 60 is engaged with/disposed within the meter box 40 of the metering system 18. One or more components of the cartridge 60 and/or the meter box 40 may include a substrate formed from a polymeric material that is coated with a metallic coating and/or a ceramic coating. The cartridge 60 includes a housing 70 configured to rotatably support the meter roller 28 within the meter box 40 (e.g., the housing 70 is secured to the meter box while the meter roller 28 rotates). The housing includes a first side 72 (e.g., cartridge drive side) and a second side 74 (e.g., cartridge bearing side), which correspond to the first side 43 and second side 61 of the meter box 40, respectively.

The cartridge 60 includes a bearing opening 76 for receiving the releasable bearing coupler 68, and in certain embodiments, a meter roller bearing 78, which may engage the meter roller 28. The meter roller 28 includes a driven shaft 80 configured to engage the drive shaft of the drive unit, thereby non-rotatably coupling the drive shaft to the meter roller. The driven shaft 80 includes a second engagement feature 84 (e.g., recesses) configured to selectively engage the first engagement feature (e.g., protrusions) of the drive shaft. The driven shaft may be an integral part of a meter roller spindle, and the flutes and recesses of the meter roller may be formed on one or more meter roller inserts non-rotatably coupled to the spindle. While the second engagement feature includes recesses in the illustrated embodiment, in other embodiments, the second engagement feature may include a cavity having a polygonal cross-section and configured to engage the drive shaft having a corresponding polygonal cross-section (e.g., first engagement feature). Furthermore, while the illustrated second engagement feature 84 facilitates shape-based engagement with the first engagement feature, in other embodiments, any variety of suitable interlocking mechanisms may be utilized for non-rotatably coupling the meter roller to the drive shaft.

In the illustrated embodiment, a drive bearing 86 is used to facilitate rotation of the drive shaft within the meter box. The drive bearing 86, the driven shaft the drive shaft, and the meter roller bearing 78 associated with the releasable bearing coupler 68 are in longitudinal alignment, thereby facilitating rotation of the meter roller 28 in response to rotation of the drive shaft. The meter roller bearing 78 may be coupled to the releasable bearing coupler 68, the driven shaft 80, or it may be a separate individual element. While the cartridge 60 is engaged with/disposed within the meter box 40, the housing 70 rotatably supports/houses the meter roller 28. To change a meter roller 28, the operator may remove the cartridge 60, replace the meter roller 28, and then reinstall the cartridge 60. Alternatively, the operator may remove the cartridge 60 and replace the cartridge with another cartridge that contains a different meter roller or with a different cartridge type.

Figure 6:
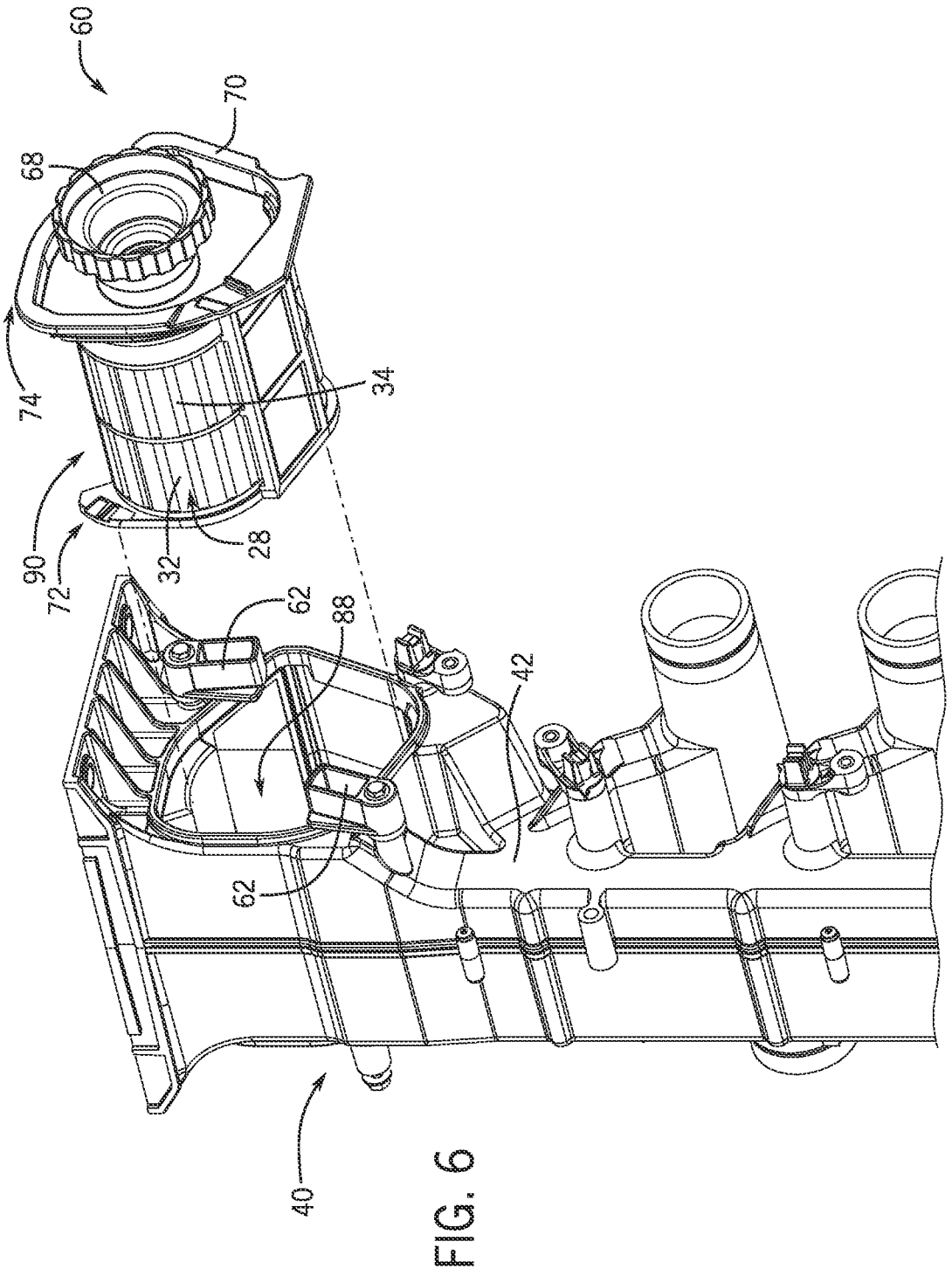
FIG. 6 is a perspective view of the metering system of FIG. 3, in which the cartridge is removed from the meter box.

FIG. 6 is a perspective view of the metering system of FIG. 3, in which the cartridge 60 is removed from the meter box 40. One or more components of the cartridge 60 and/or the meter box 40 may include a substrate formed from a polymeric material that is coated with a metallic coating and/or a ceramic coating. To remove the cartridge 60, the operator may rotate the rotatable latches to the unlocked position, in which the locking tabs 62 are positioned to facilitate removal of the cartridge, and extract the cartridge 60 from the meter box 40. As illustrated, the cross-sectional shape of the cartridge 60 (e.g., the cross-sectional shape of the first side 72, the cross-sectional shape of the second side 74, etc.) substantially corresponds to the cross-sectional shape of the meter box opening 88.

As illustrated, the meter roller 28 includes flutes 32 and recesses 34, which are configured to enable the meter roller 28 to control the flow of the flowable particulate material into the passage 42. The meter roller 28 is rotatably supported on the second side 74 of the meter roller cartridge 60 by the releasable bearing coupler 68. Once the cartridge 60 is removed from the meter box 40, the releasable bearing coupler 68 may be disengaged and removed from the meter roller/housing. Once the rotatable bearing coupler 68 is removed, the meter roller 28 may be removed through an opening 90, thereby enabling insertion of another meter roller (e.g., suitable for use with material having a larger or smaller particle size, and/or for a higher or lower target application rate).

Figure 7:
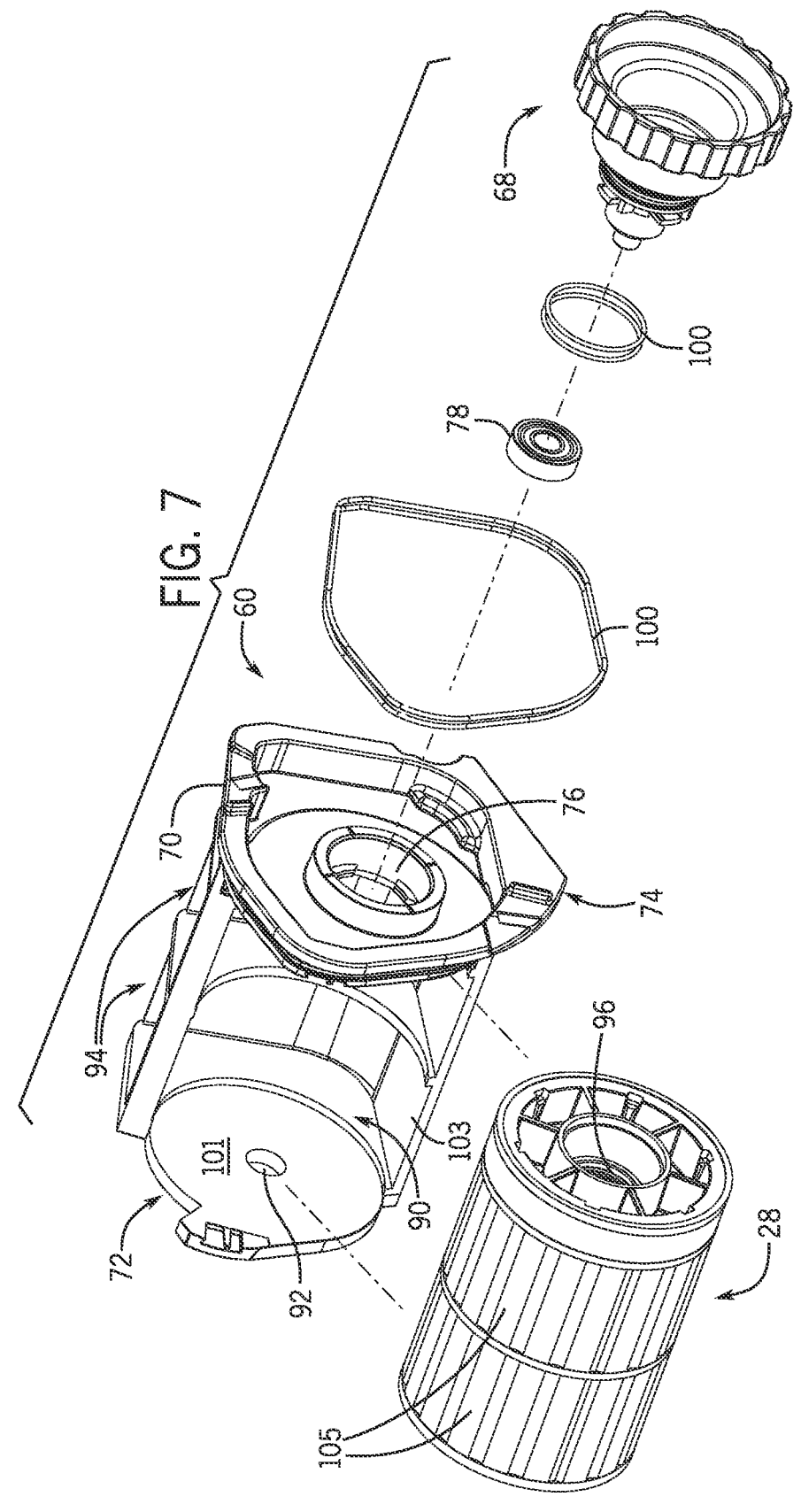
FIG. 7 is an exploded perspective view of the cartridge of FIG. 4, in which a meter roller is removed from a housing of the cartridge.

FIG. 7 is an exploded perspective view of the cartridge 60 of FIG. 4, in which the meter roller 28 is removed from the housing 70 of the cartridge 60. The housing 70 of the cartridge 60 has a drive shaft opening 92 on the first side 72 of the housing 70 and the bearing opening 76 on the second side 74 of the housing 70. The housing 70 also has the meter roller opening 90 and material receiving openings 94. The material receiving openings 94 are configured to receive the flowable particulate material into the housing 70, thereby enabling the meter roller 28 to receive the material.

To couple the meter roller 28 to the housing 70, the meter roller 28 is disposed within the housing 70 through the meter roller opening 90. While the meter roller 28 is disposed within the housing 70, the drive shaft opening 92 on the first side 72 of the housing 70 aligns with the drive shaft opening (e.g., a recess or interior cavity) of the driven shaft. In addition, the bearing opening 76 on the second side 74 of the housing 70 aligns with a bearing opening 96 (e.g., a recess or interior cavity) of the meter roller 28. The bearing opening 96 may be configured to receive the bearing 78 or the bearing may be fixedly mounted within the opening 96. The openings of the meter roller 28 and the cartridge 60 are longitudinally aligned with one another and with the drive shaft.

The meter roller cartridge 60 and/or the releasable bearing coupler 68 may include gaskets 100. While two gaskets 100 (e.g., O-rings) are included in the illustrated embodiment, in other embodiments, any suitable number of gaskets (e.g., may be used to seal adjacent parts. Once the meter roller 28 is disposed within the housing 70, the bearing opening 96 may receive the releasable bearing coupler 68, and in certain embodiments the meter roller bearing 78, via the bearing opening 76 in the housing 70. The meter roller bearing 78 may be fixedly coupled to the meter roller 28 or fixedly coupled to the releasable bearing coupler 68 in certain embodiments. In further embodiments, the meter roller bearing 78 may be an independent element. The releasable bearing coupler 68 may include the bearing 78, or the releasable bearing coupler 68 may be configured to engage the bearing 78 with a shaft of the releasable bearing coupler 68. Accordingly, the bearing 78 may be configured to engage the opening 96 of the meter roller 28 to facilitate rotation of the meter roller 28 relative to the housing 70 (e.g., rotation about the shaft of the releasable bearing coupler). The bearing coupler 68 is configured to engage the bearing opening 76 and to couple to the housing 70 via corresponding locking elements of the bearing coupler 68 and the housing 70. For example, the locking elements may interlock with one another via rotation of the bearing coupler 68 relative to the housing, thereby coupling the bearing coupler 68 to the housing 70. While the bearing coupler 68 is coupled to the housing 70, the shaft of the bearing coupler 68 rotatably supports the meter roller 28 and secures the meter roller to the housing 70.

In the illustrated embodiment, at least one element of the cartridge 60 may include a substrate formed from a polymeric material, and a metallic coating and/or a ceramic coating may be disposed on the polymeric material of the substrate. For example, the housing 70 may include a substrate formed from a polymeric material, and a metallic coating and/or a ceramic coating may be disposed on the polymeric material of the substrate. The metallic/ceramic coating may be positioned at an inner surface 101 of the housing 70, which may contact the rotating meter roller 28.

The metallic/ceramic coating may improve durability and lubricity, thereby reducing friction and/or wear. Additionally or alternatively, the metallic/ceramic coating may be positioned at one or more inner surfaces 103 of the housing 70 configured to engage the particulate material. Furthermore, in certain embodiments, the meter roller 28 may include a substrate formed from a polymeric material, and a metallic coating and/or a ceramic coating may be disposed on the polymeric material of the substrate. For example, the metallic/ceramic coating may be positioned at material-engaging surface(s) 105 of the meter roller 28, which are configured to engage the particulate material. Accordingly, the longevity of the surface(s) configured to engage the particulate material may be enhanced. Additionally or alternatively, the metallic/ceramic coating may be positioned at outer surface (s) of the meter roller, which may engage corresponding inner surface(s) of the housing.

Figure 8:
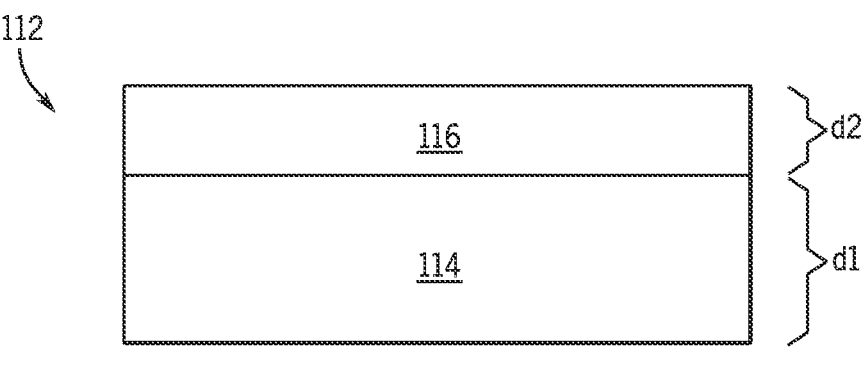
FIG. 8 is a cross sectional view of an embodiment of a component, which may correspond to any suitable metering system component of the metering system of FIG. 3, having a substrate and a coating.

FIG. 8 is a cross sectional view of an embodiment of a component 112, which may correspond to any suitable metering system component of the metering system of FIG. 3, having a substrate 114 and a coating 116. The substrate 114 (e.g., substrate layer) may be formed from a polymeric material, such as an acrylonitrile butadiene styrene (ABS), polypropylene, polycarbonate, another suitable polymeric material, or a combination thereof. As used herein with regard to the substrate, "formed from a polymeric material" refers to a substrate formed entirely from the polymeric material, or a substrate formed from the polymeric material in combination with other suitable material(s), such as fibers (e.g., fiberglass fibers, carbon fibers, polymeric fibers, ceramic fibers, metal fibers, etc.), reinforcing component(s) (e.g., metal component(s) molded into the polymeric material, etc.), other suitable component(s), or a combination thereof. The polymeric material may form an entirety of the surface area of the substrate, or the polymeric material may form a portion of the surface area of the substrate. The coating 116 (e.g., coating layer) is disposed on the polymeric material of the substrate 114, for example, to provide enhanced durability and/or lubricity, and/or to reduce maintenance operations. The coating 116 may include a metallic coating (e.g., metallic coating layer) and/or a ceramic coating (e.g., ceramic coating layer).

In certain embodiments, the metallic coating material may be sprayed and/or electroplated onto the substrate 114. For example, the polymeric substrate 114 may be cleaned and, in some embodiments, chemically and/or mechanically treated (e.g., sanded, etc.) to create rough surface(s), and then a metallic spray may be applied to the surface(s) of the substrate. The spray may be applied via arc spraying, flame spraying, another suitable technique, or a combination thereof. Additionally or alternatively, surface(s) of the substrate 114 may be prepared for electroplating, such as by applying an acid (e.g., chromic acid) to the surface(s). A solution consisting of palladium and tin salts may then be applied to the surface(s). Next, the surface(s) of the polymeric substrate 114 may be coated with metal (e.g., nickel, copper, and so on) from an electroless plating solution. The palladium and tin salt solution serves as a catalyst for application of the nickel or copper. The metallic coating 116 may then be electroplated by an electroplating system. The coating may include each of the materials applied to the surface(s) of the substrate.

Additionally or alternatively, the coating 116 may include a ceramic coating. For example, the ceramic coating may include a sprayed nanoceramic coating useful in automotive applications (e.g., applied to painted hoods, bumpers, and so on). The ceramic spray coating may include microscopic nanoparticles of SiO2 and hardeners that adhere to the polymeric substrate 114. Additionally or alternatively, the ceramic coating may include cermet, which is a combination of ceramic and metal.

Vacuum metalizing may also be used to apply the metallic coating 116. Before vacuum metalizing is performed, the polymeric substrate may be pretreated. The pretreatment may be performed chemically, mechanically, with low-energy plasma, or a combination thereof. The pretreatment may enhance the adhesion between the polymeric substrate 114 and the metallic coating 116. Next, a metal is evaporated. The vapor from the metal condenses onto the substrate 114, leaving a thin layer of metallic coating 116. To reduce oxidation, the entire process may take place within a vacuum chamber.

In the depicted embodiment, the substrate 114 has a thickness d1, and the coating 116 has a thickness d2. The thickness d1 may be larger than the thickness d2. When retrofitting or refurbishing a component, e.g., a metering system component, the coating 116 may be applied at the thickness d2 to preserve desired tolerance(s). That is, during a retrofit/refurbishment, the coating 116 may be applied at a thickness d2 so that the component remains within tolerance (s). Likewise, when manufacturing a new component, the coating 116 may be disposed on the polymeric material of the substrate 114 to establish a thickness d2 that causes the component to be within desired tolerance(s). While the coating 116 has a substantially constant thickness d2 in the illustrated embodiment, in other embodiments, the thickness of the coating may vary along at least one axis of the component.

Figure 9:
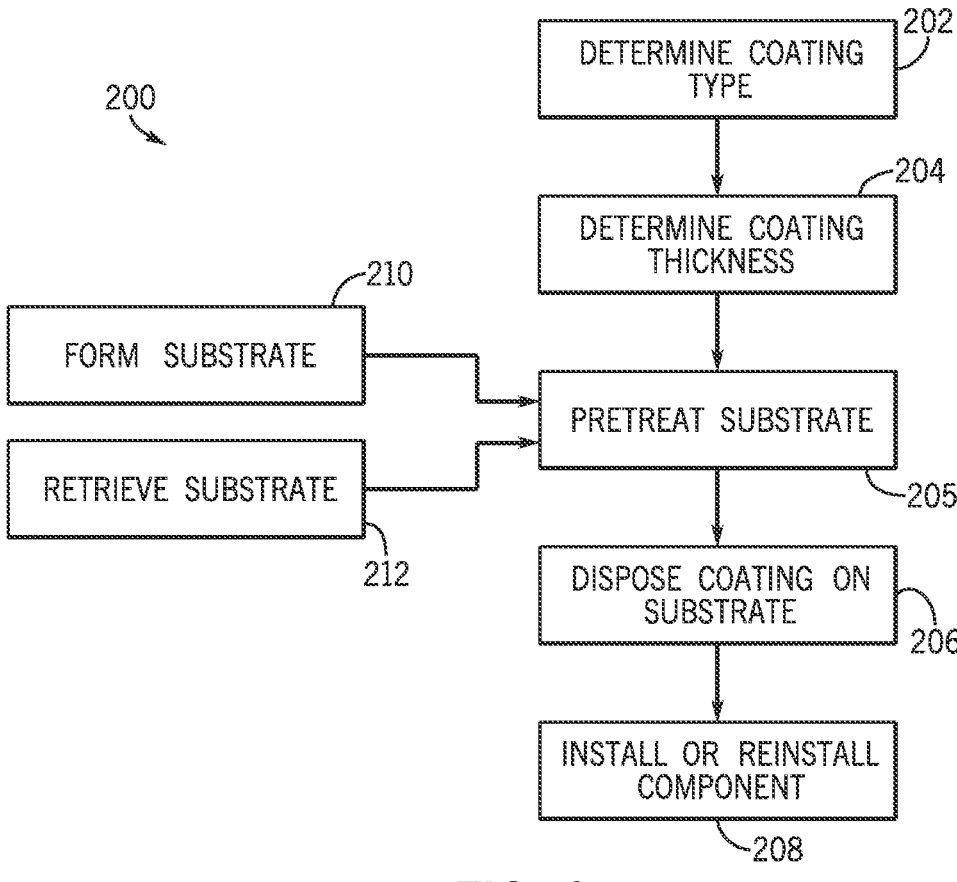
FIG. 9 is a flowchart of an embodiment of a process for refurbishing or manufacturing a coated metering system component.

FIG. 9 is a flowchart of an embodiment of a process 200 for refurbishing or manufacturing a coated metering system component. In the depicted embodiment, the process 200 may first determine (block 202) a coating type to be used. For example, the coating may include a metallic coating and/or a ceramic coating. The coating may be determined (block 202) based on the type of particulate material to be dispensed via the metering system. For example, metallic coatings may enhance durability, and ceramic coatings may enhanced lubricity.

The process 200 may then determine (block 204) a desired coating thickness. As mentioned earlier, the coating may have a thickness that enables the component to remain within desired tolerance(s). Further, the thickness may be determined based on expected operating conditions of the component. For example, the thickness of a coating expected to engage harder particulate material may be greater than the thickness of a coating expected to engage softer particulate material.

In certain embodiments, the substrate may be pretreated (block 205). For example, if the coating includes a metallic coating applied by spraying, the pretreatment process may include cleaning the substrate and, in some embodiments, chemically and/or mechanically treating (e.g., sanding, etc.) the substrate to establish rough surface(s) for the metallic spray to be applied. Furthermore, if the coating includes a metallic coating applied by electroplating, acid may be applied to surface(s) of the substrate. In addition, if the coating includes a metallic coating applied by a vacuum metalizing process, the substrate may be pretreated chemically, mechanically, or with low-energy plasma.

After the substrate is pretreated (e.g., in embodiments in which pretreatment is performed), the coating is disposed on the polymeric material of the substrate (block 206). For example, a metallic coating may be applied via a spraying process and/or an electroplating process. The spraying process may include arc spraying, flame spraying, another suitable type of spraying, or a combination thereof. The electroplating process may include applying a solution consisting of palladium and tin salts to surface(s) of the substrate. Next, the surface(s) of the substrate may be coated with metal (e.g., nickel, copper, and so on) from an electroless plating solution. The palladium and tin salt solution serves as a catalyst for application of the nickel or copper. The metallic coating may then be electroplated by an electroplating system. Furthermore, in certain embodiments, the metallic coating may also be applied by a vacuum metalizing process. Additionally or alternatively, the coating may include a ceramic coating. For example, the ceramic coating may include a sprayed nanoceramic coating. The sprayed ceramic coating may include microscopic nanoparticles of SiO2 and hardeners that adhere to the polymeric substrate. Additionally or alternatively, the ceramic coating may include cermet, which is a combination of ceramic and metal.

The component may then be installed in the metering system, or if the component is a refurbished part, reinstalled in the metering system (block 208). For example, in certain embodiments, the component is a newly manufactured component. In such embodiments, the substrate may be formed from a polymeric material before the coating is disposed on the polymeric material of the substrate or, in embodiments in which pretreatment is performed, before the substrate is pretreated (block 210). After the coating is disposed on the polymeric material of the substrate, the component may be installed in the metering system (block 208). Furthermore, in certain embodiments, the component may be refurbished. In such embodiments, the substrate may be retrieved from the metering system after the substrate is used in operation (block 212). The substrate may be retrieved before the coating is disposed on the polymeric material of the substrate or, in embodiments in which pretreatment is performed, before the substrate is pretreated. The substrate may have been previously coated, or the substrate may never have been coated. In embodiments in which the substrate was previously coated, the pretreatment process may include removal of residual coating. After the coating (e.g., new coating) is disposed on the polymeric material of the substrate, the component may be reinstalled in the metering system or in another suitable metering system (block 208). As mentioned above, the component may include any suitable component of the metering system, such as the housing of the cartridge or the meter roller.

As previously discussed, the substrate may be formed entirely from polymeric material, or the substrate may be formed from polymeric material in combination with other suitable material(s). In embodiments in which the substrate includes other suitable material(s) that form a portion of the surface area of the substrate, the coating may be disposed on the polymeric material alone, or the coating may be disposed on the polymeric material and at least a portion of the other suitable material(s) that form the surface area of the substrate. Furthermore, in certain embodiments, the coating may be disposed on an entirety of the substrate, thereby establishing a component in which all surfaces of the component are formed by the coating. However, in other embodiments, the coating may only be disposed on a portion of the substrate, thereby establishing a component in which a first portion of the surfaces of the component are formed by the coating and a second portion of the surfaces of the component are formed by the substrate. For example, the component may include coating positioned at the surface(s) configured to engage particulate material, and the component may not include coating positioned at the surface(s) not configured to engage the particulate material. By way of further example, the component may include coating positioned at the surface(s) configured to engage a moving element, and the component may not include coating positioned at the surface(s) not configured to engage the element. Furthermore, multiple coatings, each having a different configuration, may be disposed on a substrate at different locations. For example, a first coating having a first coating configuration may be positioned at first surface(s) of the component, and a second coating having a second coating configuration may be positioned at second surface(s) of the component. Each coating configuration may include a selected coating type (e.g., ceramic or metallic), a selected coating thickness, a selected coating application method, or a combination thereof.

In certain embodiments, the metering system component having a substrate formed from a polymeric material and a metallic/ceramic coating disposed on the polymeric material of the substrate is a functional moving component of the metering system (e.g., a metering device, such as the meter roller, etc.) or a structural component of the metering system (e.g., a housing, such as the cartridge housing, a meter box housing, etc.), as compared to a cover disposed on a functional moving component or a structural component (e.g., a shield disposed on an interior of a meter box housing, etc.). In addition, while the metering system disclosed above is positioned on an air cart, in certain embodiments, the metering system may be positioned on an implement (e.g., seeding implement) or on a self-propelled vehicle (e.g., including row units). Furthermore, while the metering system disclosed above includes cartridges to facilitate removal and replacement of meter rollers, in certain embodiments, the metering system may not include cartridges (e.g., the meter roller(s) may be rotatably coupled to housing(s)).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural metering system, comprising:
a metering system component, comprising:
   a meter roller configured to be housed within a meter box and to regulate a flow of particulate material into an air flow, wherein the meter roller comprises:
   a substrate formed from a polymeric material; and
   a coating disposed on the polymeric material of the substrate, the coating comprising a metallic coating, a ceramic coating, or a combination thereof, wherein the coating is positioned at a surface of the meter roller configured to engage the particulate material.

2. The agricultural metering system of claim 1, wherein the metering system component comprises a cartridge configured to be disposed within the meter box, and the cartridge comprises the meter roller.

3. The agricultural metering system of claim 2, wherein the cartridge comprises a housing, and the housing comprises:
   a substrate formed from a polymeric material; and
   a coating disposed on the polymeric material of the substrate of the housing, the coating of the housing comprising a metallic coating, a ceramic coating, or a combination thereof, wherein the coating of the housing is positioned at a surface of the housing configured to engage the particulate material.

4. The agricultural metering system of claim 2, wherein the cartridge comprises a housing, and the housing comprises:
   a substrate formed from a polymeric material; and
   a coating disposed on the polymeric material of the substrate of the housing, the coating of the housing comprising a metallic coating, a ceramic coating, or a combination thereof, wherein the coating of the housing is positioned at a surface of the housing configured to engage the meter roller.

5. The agricultural metering system of claim 1, wherein the coating comprises the metallic coating, and the metallic coating comprises nickel, copper, or a combination thereof.

6. The agricultural metering system of claim 1, wherein the coating comprises the ceramic coating, and the ceramic coating comprises $SiO_2$.

7. The agricultural metering system of claim 1, wherein the coating comprises the metallic coating, and the metallic coating comprises a spray coating, an electroplated coating, a vacuum metalizing coating, or a combination thereof.

8. The agricultural metering system of claim 1, wherein the coating comprises the ceramic coating, and the ceramic coating comprises a spray coating.

9. The agricultural metering system of claim 1, wherein the meter roller is configured to be retrieved from the meter box to facilitate disposition of the coating on the polymeric material of the substrate.

10. A method of manufacturing a metering system component for an agricultural metering system, comprising:
   retrieving a substrate of the metering system component from the agricultural metering system after the substrate is used in operation, and
   disposing a coating on the substrate after retrieving the substrate from the agricultural metering system, the coating comprising a metallic coating, a ceramic coating, or a combination thereof, wherein the substrate is formed from a polymeric material, and the coating is disposed on the polymeric material.

11. The method of claim 10, comprising pretreating the substrate before disposing the coating on the substrate.

12. The method of claim 10, wherein disposing the coating on the substrate comprises disposing the metallic coating on the substrate via a spray, via electroplating, via vacuum metalizing, or via a combination thereof.

13. The method of claim 10, wherein disposing the coating on the substrate comprises disposing the ceramic coating on the substrate by spraying a $SiO_2$ coating on the substrate.

* * * * *